Patented Mar. 27, 1934

1,952,845

UNITED STATES PATENT OFFICE 1,952,845

PROCESS FOR CONCENTRATING AQUEOUS SOLUTIONS OF LOWER ALIPHATIC ACIDS

Henry Dreyfus, London, England

No Drawing. Application July 23, 1930, Serial No. 470,233. In Great Britain August 12, 1929

15 Claims. (Cl. 260—122)

This invention relates to improvements in the concentration of aqueous solutions of lower aliphatic acids and particularly to the production of highly concentrated acetic acid by concentration of dilute acetic acid of whatever origin, such as crude pyroligneous acid, acetic acid obtained as a waste product in acetylation processes such as the acetylation of cellulose, fermentation acid, etc.

When extracting acetic acid from its aqueous solutions with solvents such as ether, ethyl acetate and the like it is found that acetic acid of concentration only up to about 70% is obtainable, due to the fact that water is soluble to some extent in these solvents. Owing to the solvent power of such solvents for acetic acid it is not difficult, however, to secure almost complete extraction of the acid, leaving but little in the residual aqueous liquid. On the other hand the commercially available solvents of suitable boiling point in which water is substantially insoluble, such as benzol or petroleum ether, have in general low solvent power for acetic acid in presence of water, i. e. the partition coefficient between the solvent and water with respect to acetic acid is low; the efficiency of the extraction process is therefore low.

The aforesaid difficulties are overcome in the process described in U. S. Patent No. 1,696,432, according to which acetic and other lower aliphatic acids of high concentration are obtained by extracting the dilute aqueous acids with a medium consisting of a solvent for the acid, for example ether, in admixture with a hydrocarbon such as benzene or petroleum ether. In this manner acetic acid of, for example, 90–95% strength may be readily obtained.

According to U. S. patent application S. No. 375,341 dated 1st July, 1929 (now Patent No. 1,805,127 dated May 12, 1931) the concentration of acetic and other lower fatty acids is carried out by extraction with solvents in a plurality of (i. e. two or more) stages by extraction with solvent media such that the ratio of the solubility of the lower fatty acid in the extracting medium to that of water in the extracting medium increases successively from stage to stage.

The present invention is likewise concerned with the concentration of aqueous lower fatty acids by extraction processes, but differs from the aforementioned processes in that any water simultaneously extracted is removed from the extract by a subsequent process and special precautions are not necessary to prevent the extraction liquid from taking up water from the dilute acid. By working in this manner the extracting liquid may be selected solely for its solvent power for lower aliphatic acids in the presence of water, and less regard need be paid to the solubility of water in it.

In concentrating dilute aliphatic acids by extraction with solvents in accordance with the present invention, the dilute acid is extracted with a suitable solvent and the extract, if desired after distilling off part of the solvent, is then mixed with a liquid which will diminish the solubility of water in the extract. By suitable selection of the solvent and added liquid it is thus possible to precipitate water from the acid extract, and after separation of the said water, which will usually be in the form of a dilute acid, the residual extract may be distilled or otherwise treated to obtain highly concentrated acid and to recover the solvent and added liquid.

It will be seen that the essence of the new process consists in the addition of the water-precipitating liquid to the homogeneous mixture of acid, water and solvent.

For the extraction process any convenient solvents for the lower fatty acids may be used, for example any of those mentioned in U. S. Patent No. 1,696,432, e. g. ether, ethyl acetate, acetone oils and the like, the solvents being preferably chosen with particular regard to their efficiency in extracting lower aliphatic acids from their aqueous solutions. As the extract is to be treated subsequently for removal of water the fact that the solvent may simultaneously take up more or less water is of less moment, but if desired the solvents may be used in admixture with hydrocarbons, in the manner described in U. S. Patent No. 1,696,432, or with other similarly acting substances having a low solvent power for water, e. g. a halogenated hydrocarbon such as methylene chloride or carbon tetrachloride. The solvents, whether used with or without hydrocarbons or other admixture, may be used in conjunction with salts according to the known art to reduce their solubility in water.

In order to cause separation of water from the acid extract there may be added any suitable liquids capable of diminishing the solubility of water therein, and these liquids will, in general, be such as are substantially non-solvents for water, for example hydrocarbons, e. g. petroleum distillates, benzene or the like, and halogenated aliphatic hydrocarbons, e. g. carbon tetrachloride, dichlorethylene, trichlorethylene and acetylene tetrachloride. The choice of the water-precipitating liquid will depend in any one case upon the particular acid to be concentrated and the solvent employed for the extraction. Preferably the liquid used is one which may readily be separated from the solvent and from the acid by distillation or otherwise, for example its boiling point should differ considerably from that of each. Thus, for example, when ether has been employed as the solvent in the extraction process water may be separated from the extract by addition of benzene or a petroleum distillate of approximately the same boiling point as benzene, say of boiling point 60–90° C., or of a halogenated hydrocarbon such as chloroform or carbon tetrachloride. In the case of ethyl acetate addition of petroleum ether of boiling point about 40–60° C. or of a petroleum distillate boiling at 90–100° C. has been found suitable. If desired the water-precipitating liquid may consist of a further quantity of the same liquid which has been added to the solvent used in the extraction process when such addition has been made.

The extraction of the aqueous aliphatic acid may be carried out in any well known manner, for example by thorough mixing of the acid and the extraction medium and then allowing to separate into layers, or by extraction in a column using the counter-current principle in which case the column may if desired be filled with any suitable packing. If, as will usually be the case, the extracting medium is specifically lighter than the aqueous acid, the latter will be introduced at the top of the column and the medium at the bottom, while the reverse will obtain if the medium is specifically heavier. Either or both the acid and the extracting medium may be introduced into the column through sprays, nozzles or the like.

A further method of carrying out the extraction consists in introducing the extraction medium in the form of vapor into the acid still in liquid form, and such extraction may be carried out in a column apparatus, the acid being introduced at the top in the form of a spray and being if desired preheated, while the vapour of the extracting medium is introduced at the bottom. The tower or column is preferably packed with any suitable material so as to obtain good mixing and may also be provided with a heating jacket.

The treatment of the extract with the water-precipitating liquid may be carried out in any suitable mixing apparatus, for example in a tower or column containing suitable packing or by introducing the extract and water-precipitating liquid into a vessel provided with agitating means. After thorough mixing, the water which has separated out, usually in the form of dilute acid, may be removed in any desired manner, for example by the use of a settling tank in which the aqueous liquid may constitute either the upper or the lower layer depending on the relative densities of the solvent and water or aqueous acid. If desired the dilute acid so separated may be returned to be extracted again with solvent.

After removal of the water the residual liquids containing concentrated acid together with solvent and water-precipitating liquid may be separated into their components in any desired manner, for example by distillation. A liquid comprising concentrated acetic acid, ether and either benzene or a petroleum distillate boiling at about 70–90° C. may, for instance, be introduced into a column distillation apparatus, ether vapors being drawn off at the top. The liquid drawn off from the base of the column and comprising concentrated acid and benzene or petroleum distillate may then be treated in a second distillation column, concentrated acetic acid being drawn off from the lower end.

Both the solvent used for the extraction and the water-precipitating liquid subsequently added to the extract may advantageously be such as form with water azeotropic mixtures of boiling points below those of the said solvent and additions thereto. Where such is the case it is not essential to precipitate the whole of the water from the extract since appreciable quantities may be distilled off together with the solvent, etc. If desired still further quantities of water may be removed in the form of azeotropic mixtures by returning the solvent and/or water-precipitating liquid, after condensation and separation from water, in the known manner to the distillation vessel or to appropriate points in the distillation column when such is employed.

The invention has been described principally with reference to the concentration of acetic acid, but it may, of course, be equally well applied to the concentration of other lower aliphatic acids, for example propionic acid.

The following example shows the best method known to me for carrying the invention into effect.

Example

Acetic acid of about 30% strength, obtained for instance as a by-product in the manufacture of cellulose acetate, is extracted with ether in a counter-current extraction apparatus such as is described in the example of U. S. Patent No. 1,696,432. The extract flowing from the upper end of the extraction column and consisting of ether and acetic acid containing about 30% of water is continuously passed into a mixing chamber together with benzene at about an equal rate and the mixture run into a separator in which water separates out in the form of a dilute acetic acid. The upper layer consisting substantially of ether, benzene, and acetic acid then flows into a continuous distillation apparatus of the column type in which ether is separated as vapor, condensed, and returned to the extraction stage of the process. The residual liquid flowing from the bottom of the still consists substantially of benzene and acetic acid and is subjected to a second distillation in order to separate the acid in concentrated form. Preferably a column still is also used here, concentrated acetic acid being delivered at the bottom, and at the top benzene vapors which may carry, in the form of azeotropic mixtures, small amounts of acetic acid and any residual water. These vapors are condensed and the benzene returned to the process, if necessary after separation from any water.

What I claim and desire to secure by Letters Patent is:—

1. Process for concentrating aqueous lower aliphatic acids which comprises precipitating water from a homogeneous mixture of aqueous acid and a good solvent for the acid by means of a liquid which is miscible with the mixture and has low solvent power for water.

2. Process for concentrating aqueous solutions of lower aliphatic acids which comprises extracting the aqueous solutions with a good solvent for the acid and precipitating water from the extract by means of a liquid miscible with the extract and having low solvent power for water and recovering the precipitated water in the liquid state.

3. Process for concentrating aqueous solutions of lower aliphatic acids which comprises extracting the aqueous solutions with a good solvent for the acid, precipitating water from the extract by means of a liquid of low solvent power for water, separating the water in the liquid state, and distilling the extract to obtain concentrated acid and to recover the good solvent and liquid of low solvent power for water.

4. Process according to claim 3 wherein the good solvent and liquid of low solvent power for water have boiling points sufficiently remote one from another and from that of the acid to promote easy separation by fractional distillation.

5. Process for concentrating aqueous solutions of lower aliphatic acids which comprises extracting the aqueous solutions with a good solvent for the acid, precipitating water from the extract by means of a liquid of low solvent power for water, and separating the water in the liquid state, at least one of the liquids, good solvent and liquid of low solvent power for water, forming with water an azeotropic mixture of boiling point below that of the acid.

6. Process for concentrating aqueous solutions of acetic acid which comprises extracting the aqueous solutions with a good solvent for the acid, precipitating water from the extract by means of a liquid of low solvent power for water, separating the water in the liquid state, and distilling the extract to obtain concentrated acid and to recover the good solvent and liquid of low solvent power for water.

7. Process according to claim 6 wherein the good solvent and liquid of low solvent power for water have boiling points sufficiently remote one from another and from that of the acid to promote easy separation by fractional distillation.

8. Process for concentrating aqueous solutions of acetic acid which comprises extracting the aqueous solutions with a good solvent for the acid, precipitating water from the extract by means of a liquid of low solvent power for water, and separating the water in the liquid state, at least one of the liquids, good solvent and liquid of low solvent power for water, forming with water an azeotropic mixture of boiling point below that of the acid.

9. Process for concentrating aqueous solutions of acetic acid which comprises extracting the aqueous solutions with ethyl ether, precipitating water from the extract by means of a liquid of low solvent power for water and removing the precipitated water in the liquid state.

10. Process for concentrating aqueous solutions of acetic acid which comprises extracting the aqueous solutions with ethyl acetate, precipitating water from the extract by means of a liquid of low solvent power for water and removing the precipitated water in the liquid state.

11. Process for concentrating aqueous solutions of lower aliphatic acids which comprises extracting the aqueous solutions with a good solvent for the acid and precipitating water from the extract by means of a liquid selected from the group consisting of hydrocarbons and halogenated hydrocarbons, and removing the precipitated water in the liquid state.

12. Process for concentrating aqueous solutions of acetic acid which comprises extracting the aqueous solutions with a good solvent for the acid and precipitating water from the extract by means of a liquid selected from the group consisting of hydrocarbons and halogenated hydrocarbons, and removing the precipitated water in the liquid state.

13. Process for concentrating aqueous solutions of acetic acid which comprises extracting the aqueous solutions with ethyl ether, precipitating water from the extract by means of a liquid selected from the group consisting of hydrocarbons and the halogenated hydrocarbons, and removing the precipitated water in the liquid state.

14. Process for concentrating aqueous solutions of acetic acid which comprises extracting the aqueous solutions with ethyl ether, precipitating water from the extract by means of benzene, and removing the precipitated water in the liquid state.

15. Process for concentrating aqueous solutions of acetic acid which comprises extracting the aqueous solutions with ethyl ether, precipitating water from the extract by means of benzene, removing the precipitated water in the liquid state, and distilling the extract to obtain concentrated acetic acid and recover ethyl ether and benzene.

HENRY DREYFUS.